United States Patent
Zou et al.

(10) Patent No.: US 6,623,865 B1
(45) Date of Patent: Sep. 23, 2003

(54) LEAD ZIRCONATE TITANATE DIELECTRIC THIN FILM COMPOSITES ON METALLIC FOILS

(75) Inventors: Qin Zou, Toronto (CA); Ben G. Yacobi, Mississauga (CA); Harry Eugen Ruda, North York (CA); Mark Farrell, Collingwood (CA)

(73) Assignee: Energenius, Inc., Ontario (CA)

( * ) Notice: Subject to any disclaimer, the term of this patent is extended or adjusted under 35 U.S.C. 154(b) by 0 days.

(21) Appl. No.: 09/518,532

(22) Filed: Mar. 4, 2000

(51) Int. Cl.[7] ............................................. B32B 17/00
(52) U.S. Cl. ..................... 428/472; 428/699; 428/701; 428/702; 501/134; 501/135; 501/136; 501/137; 501/152
(58) Field of Search ................. 428/210, 469, 428/699, 701, 702, 472; 501/134, 135, 136, 137, 152

(56) References Cited

U.S. PATENT DOCUMENTS

| | | | |
|---|---|---|---|
| 4,283,228 A | 8/1981 | Buchanan et al. | 106/73.3 |
| 5,112,433 A | 5/1992 | Dawson et al. | 156/623 |
| 5,116,643 A | 5/1992 | Miller et al. | 427/126.3 |
| 5,138,520 A | 8/1992 | McMillan et al. | 361/311 |
| 5,173,354 A | 12/1992 | Raj | 428/209 |
| 5,198,269 A | 3/1993 | Swartz et al. | 427/226 |
| 5,244,742 A | 9/1993 | Ogi et al. | 428/469 |
| 5,265,315 A | 11/1993 | Hoisington et al. | 29/25.35 |
| 5,271,955 A | 12/1993 | Maniar | 427/100 |
| 5,308,807 A | 5/1994 | Moeggenborg et al. | 501/134 |
| 5,348,775 A | 9/1994 | Lin | 427/555 |
| 5,384,294 A | 1/1995 | Teowee et al. | 501/134 |
| 5,391,393 A | 2/1995 | Maniar | 427/100 |
| 5,425,889 A | 6/1995 | Lubitz et al. | 252/62.9 |
| 5,453,294 A | 9/1995 | Ogi et al. | 427/100 |
| 5,456,945 A | 10/1995 | McMillan et al. | 427/252 |
| 5,462,647 A | 10/1995 | Bhattacharya et al. | 205/74 |
| 5,491,102 A | 2/1996 | Desu et al. | 437/52 |
| 5,541,807 A | 7/1996 | Evans, Jr. et al. | 361/321.5 |
| 5,645,885 A | 7/1997 | Nishimoto | 427/126.3 |
| 5,719,606 A | 2/1998 | Kigawa et al. | 347/69 |
| 5,786,048 A | 7/1998 | Gesemann et al. | 428/34.6 |
| 5,935,485 A | 8/1999 | Tani et al. | 252/62.9 |
| 5,962,085 A | 10/1999 | Hayashi et al. | 427/585 |
| 5,965,219 A | 10/1999 | Hayashi et al. | 427/586 |
| 5,976,705 A | 11/1999 | Koiwa et al. | 428/469 |
| 6,013,334 A | 1/2000 | Kamisawa | 427/551 |
| 6,180,252 B1 | 1/2001 | Farrell et al. | |
| 6,207,522 B1 | 3/2001 | Hunt | |
| 6,270,835 B1 | 8/2001 | Hunt | |
| 6,433,993 B1 | 8/2002 | Hunt | |
| 6,541,137 B1 | 4/2003 | Kingon | |

FOREIGN PATENT DOCUMENTS

| EP | 0 441 408 | 8/1991 |
|---|---|---|
| EP | 0 513 478 | 11/1992 |

OTHER PUBLICATIONS

Patent Abstracts of Japan vol. 1999, No. 01 JP 10 270766 Oct. 9, 1998 abstract.

*Primary Examiner*—Cathy Lam
(74) *Attorney, Agent, or Firm*—Locke Liddell & Sapp LLP

(57) ABSTRACT

Crystalline dielectric lead zirconate titanate thin film composites on metallic foils exhibit high dielectric constants, low dielectric loss (loss tangent of less than 5%) and low leakage current. The lead zirconate titanates may be of the formula $PbZr_xTi_yO_z$ (PZT) wherein x and y are independently from about 0.35 to about 0.65 and z is from about 2.5 to about 5.0. The thin foil dielectric composites can be prepared by a variety of methods including deposition of PZT thin films on brass, platinum, titanium, and stainless steel foils using sol-gel processing, sputtering deposition and chemical vapor deposition.

23 Claims, 8 Drawing Sheets

LEAD ZIRCONATE TITANATE DIELECTRIC THIN FILM COMPOSITES ON METALLIC FOILS

FIELD OF THE INVENTION

The invention relates to crystalline dielectric thin film structures on metallic foils. Such thin foil dielectric systems can be prepared, for example, by depositing $PbZr_xTi_yO_z$ (PZT) thin films on selected metallic substrates such as brass, platinum, titanium and stainless steel foils using sol-gel methods, sputtering deposition methods, or metal-organic chemical vapor deposition.

BACKGROUND OF THE INVENTION

Lead zirconate titanate (PZT) thin films have attracted considerable interest as potential candidate materials for electronic and optoelectronic applications, such as ferroelectric memory devices, pyroelectric sensor devices, waveguide modulators and acoustic sensors. Most PZT films are currently deposited on silicon substrate with a Pt bottom electrode limiting their range of potential applications. Alternative structures are desired which permit high frequency operation range, low dielectric loss, low ESR, and the potential for embedded capacitor systems.

Previous attempts at depositing dielectric films on metal substrates have been reported in the literature. For example, Saegusa (*Japanese Journal of Applied Physics*, Part 1, vol. 36, no. 11; November 1997; p. 6888-93) reported on the deposition of non-crystalline (glassy) films of $PbZr_{0.5}Ti_{0.5}O_3$ (PZT) thin films on aluminum, titanium and stainless steel foils. The resulting products, however, do not exhibit the requisite properties needed for commercial applications.

SUMMARY OF THE INVENTION

The invention relates to crystalline dielectric thin film structures on metallic foils. Such thin foil dielectric systems can be prepared, for example, by depositing $PbZr_xTi_yO_z$ (PZT) thin films on brass, platinum, nickel alloys, titanium and stainless steel foils using various methods such as sol-gel processing, sputtering deposition, and metal-organic chemical vapor deposition. The crystalline dielectric films of the invention include single-crystalline, poly-crystalline, and nano-crystalline films, i.e., films with grain sizes varying from nanometer-scale to cm-scale.

The crystalline dielectric thin film structures of the invention exhibit excellent properties for capacitors, including high dielectric constant ($\in$=400), low dielectric loss (loss tangent of <5%) and low leakage current (below $5 \times 10^{-7}$ A at 5V). In addition, the thin film structures of the invention exhibit high frequencies.

BRIEF DESCRIPTION OF THE DRAWINGS

FIG. 1(*a*) is a structure composed of a crystalline dielectric thin film deposited on a metallic foil.

FIG. 1(*b*) is a structure composed of a crystalline dielectric thin film deposited on a metallic foil that also includes an interposed barrier layer between the dielectric film and a metallic foil.

FIG. 1(*c*) is a structure composed of a single or multiple different crystalline dielectric thin films deposited on a metallic foil that also includes various interposed barrier layers between the dielectric film and a metallic foil.

FIG. 1(*d*) is a structure composed of a single or multiple different crystalline dielectric thin films deposited on a metallic foil that also includes an interposed buffer layer in addition to various barrier layers interposed between the dielectric film and metallic foil.

FIG. 1(*e*) represents an embodiment offering an enhanced surface area wherein a textured substrate is employed incorporating the various combinations as described for FIGS. 1(*a*) to 1(*d*).

FIG. 1(*f*) represents an embodiment offering an enhanced surface area wherein a porous structured substrate is employed incorporating the various combinations as described for FIGS. 1(*a*) to 1(*d*).

FIG. 1(*g*) represents an embodiment of a parallel interconnection of many dielectric metallic foil systems.

FIG. 1(*h*) represents an embodiment of a series interconnection of many dielectric metallic foil systems.

DETAILED DESCRIPTION OF THE PREFERRED EMBODIMENT

Figure 1A:
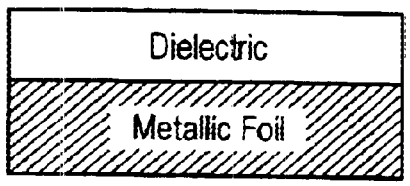
FIG. 1 is a schematic drawing of various configurations for crystalline dielectric thin film structures on metallic foils.

A crystalline dielectric thin film composite contains a metallic foil as substrate.

The metal of the foil should possess a high melting point, exhibit a close match of thermal expansion coefficient to PZT, show low reactivity with PZT, and permit good adhesion with PZT. The melting point is most preferably at least 850° C. Preferably, the thin film composite incorporates one or more barrier layers, various buffer layers, along with a dielectric thin-film. In a preferred embodiment, the dielectric material is of the formula $PbZr_xTi_yO_z$ wherein both x and y are about 0.5 and z is about 2.5 to about 5.

The inorganic oxides forming the dielectric are bonded to the substrate. Such oxides exhibit a tetragonal or perovskite crystalline lattice. The inorganic oxides may further exhibit dielectric, ferroelectric and/or paraelectric properties.

In a preferred embodiment, the laminate is one wherein the inorganic oxides are interposed between two substrate layers; the substrates being independently selected from different types of electrically conductive metals or from different types of nonconducting and electrically conductive substrates having a melting point of at least 850° C.

In general, the oxide films as-deposited are only partially crystalline. Since the dielectric properties are enhanced by film crystallinity, a post deposition thermal treatment is often used. This can be accomplished by rapid thermal annealing using quartz halogen lamps, laser-assisted annealing (such as that wherein an excimer or carbon dioxide laser is employed) or an electron beam annealing.

The thin films or plates of the invention may be made by a sol-gel process. This process is preferred since it renders film composites of high purity. In addition, the sol-gel process employees low processing temperatures. Crystallization temperatures are normally between 500 and 700° C. Deposition of PZT on a metallic substrate requires a low processing temperature to minimize interdiffusion and reaction between the foil and the dielectric. Further, the composition is easily controlled by use of the sol-gel process.

The dielectric material for use in the invention may contain a metal of the lanthanide series. Preferably either La or Nb is used. Suitable dielectrics include those of the formula $Pb_aL_bZr_xTi_yO_z$ wherein L is a lanthanide metal, preferably La or Nb, x and y are independently between from about 0.35 to about 0.65, z is from about 2.5 to about 5.0, a is from about 0.95 to about 1.25 and b is from about 0.02 to about 0.10. Such dielectrics may be prepared by using, as starting materials, lead acetate [$Pb(CH_3COO)_2H_2O$], zirconium n-propoxide [$Zr(O-nC_3H_7)_4$], titanium isopropoxide [$Ti(O-iC_3H_7)_4$] and lanthanum isopropoxide [$La(O-iC_3H_7)_3$] or niobium ethoxide [$Nb(OC_2H_5)_5$]. In a preferred method, the dielectric is prepared by dissolving lead acetate trihydrate in 2-methoxyethanol and dehydrating the composition at 110° C. under vacuum to obtain lead acetate. Zirconium n-propoxide and titanium isopropoxide in 2-methoxyethanol may then be admixed with the resulting product which is at room temperature, then refluxed at 110° C. for about 2 to 3 hours under vacuum from which polymer precursors, such as those of the formula $Pb(Zr_{0.52}Ti_{0.48})O_3$, may be obtained. Finally, the 0.3 M stock solutions may be obtained by dilution with toluene and adding appropriate formamade for protecting from crack and 10 mol % excess Pb for loss of lead oxide during the final annealing processing.

The PZt solution is deposited using spin-coating technology on various metal foils, such as titanium foil (thickness, d, is 0.054 mm, surface roughness, Ra, is 550 nm); aluminum foil (d=0.05 mm, Ra=200 nm); stainless steel foil (d=0.052 mm, Ra=540 nm); brass sheet (d=1.2 mm, Ra=60 nm); or nickel alloy sheet (d=1.5 mm, Ra≈800 nm). Before deposition the substrates are cleaned, such as by using acetone (in an ultrasonic cleaner), to remove oil. The spin speed used is typically 2000 rpm for 30 s. Each spin on the layer is then dried at 200° C. for 5~10 min on the hot plate. The thickness of each layer is about 110 nm. The deposited films may then be fired at 450° C. for 20 min and then crystallized at 600° C. for 30 min using rapid thermal annealing (RTA).

The dielectric constant of the thin film composites of the invention may be more than 400. To obtain the desired high values of dielectric constant for the thin films, a ferroelectric, dielectric and/or paraelectric phase transition is induced. The onset of this transition depends on the annealing temperature. Thus, the product is annealed at elevated temperature until crystallization. Generally, the annealing temperature is between from about 600° C. to about 800° C. Higher annealing temperatures tend to increase the average grain sizes in the films.

EXAMPLES

Example 1

PZT Precursor Preparation

The starting materials for PZT film preparation was lead acetate [$Pb(CH_3COO)_2H_2O$], zirconium n-propoxide [$Zr(O-nC_3H_7)_4$], titanium isopropoxide [$Ti(O-iC_3H_7)_4$] and lanthanum isopropoxide [$La(O-iC_3H_7)_3$] or niobium ethoxide [$Nb(OC_2H_5)_51$].

PZT stock solution was prepared basically by dissolving lead acetate trihydrate in 2-methoxyethanol and dehydrating it at 110° C. under vacuum to obtain Pb acetate. The zironium n-propoxide and titanium isopropoxide in 2-methoxyethanol was then mixed at room temperature. The Zr+Ti solution was added to the Pb acetate which was then refluxed at 110° C. for two to three hours under vacuum ambient and finally distilled by product. A $Pb(Zr_{0.52}Ti_{0.48})O_3$ polymer precursor was obtained. Finally, a 0.3 M stock solution was obtained by dilution with toluene and adding appropriate formamide for protecting from crack and 10 mol % excess Pb for loss of lead oxide during the final annealing processing.

Deposition

A PZT precursor solution was then deposited using spin-coating technology onto:

Titanium foil (thickness(d)=0.054 mm, surface roughness (Ra=550 nm);

Aluminum foil (d=0.05 mm, Ra=200 nm);

Stainless steel foil (d=0.052, Ra=540 nm);

Brass sheet (d=1.2 mm, Ra=60 nm);

Nickel alloy sheet (d=1.5 mm, Ra≈800 nm).

Before deposition, the substrates are preferably cleaned using acetone under ultrasonic to remove oil. The spin speed was 2000 rpm for 30 seconds. Each spin on the layer was dried at 200° C. for 5~10 min on the hot plate. The thickness of each layer was about 110 nm.

Heat Treatment

The deposited films were then fired at 450° C. for 20 min and then crystallized at 600° C. for 30 min using rapid thermal annealing (RTA).

It is most preferably that all reactants used in the process be of high purity. Generally, the level of purity is greater than 90%, preferably greater than 95%, most preferably greater than 99%. In addition; it is preferred that the individual steps of the invention be conducted in a nitrogen-free atmosphere.

The samples obtained and tested are tabulated in Table 1.

TABLE 1

| Sample Code | Ti550 | Ti600 | Ti650 | BR600 | SS550 | SS600 | S5650 |
|---|---|---|---|---|---|---|---|
| Substrate | Titanium | | | Brass | Stainless Steel | | |
| Film precursor | PZT Polymer in Toluene (as described in Experimental Sect.) | | | | | | |
| Annealing Temperature (° C.) | 550 | 600 | 650 | 600 | 550 | 600 | 650 |
| Dielectric constant | 288 | 480 | 256 | 305 | 192 | 165 | 150 |
| Thickness of PZT (nm) | | | | 660 | | | |

Figure 2:
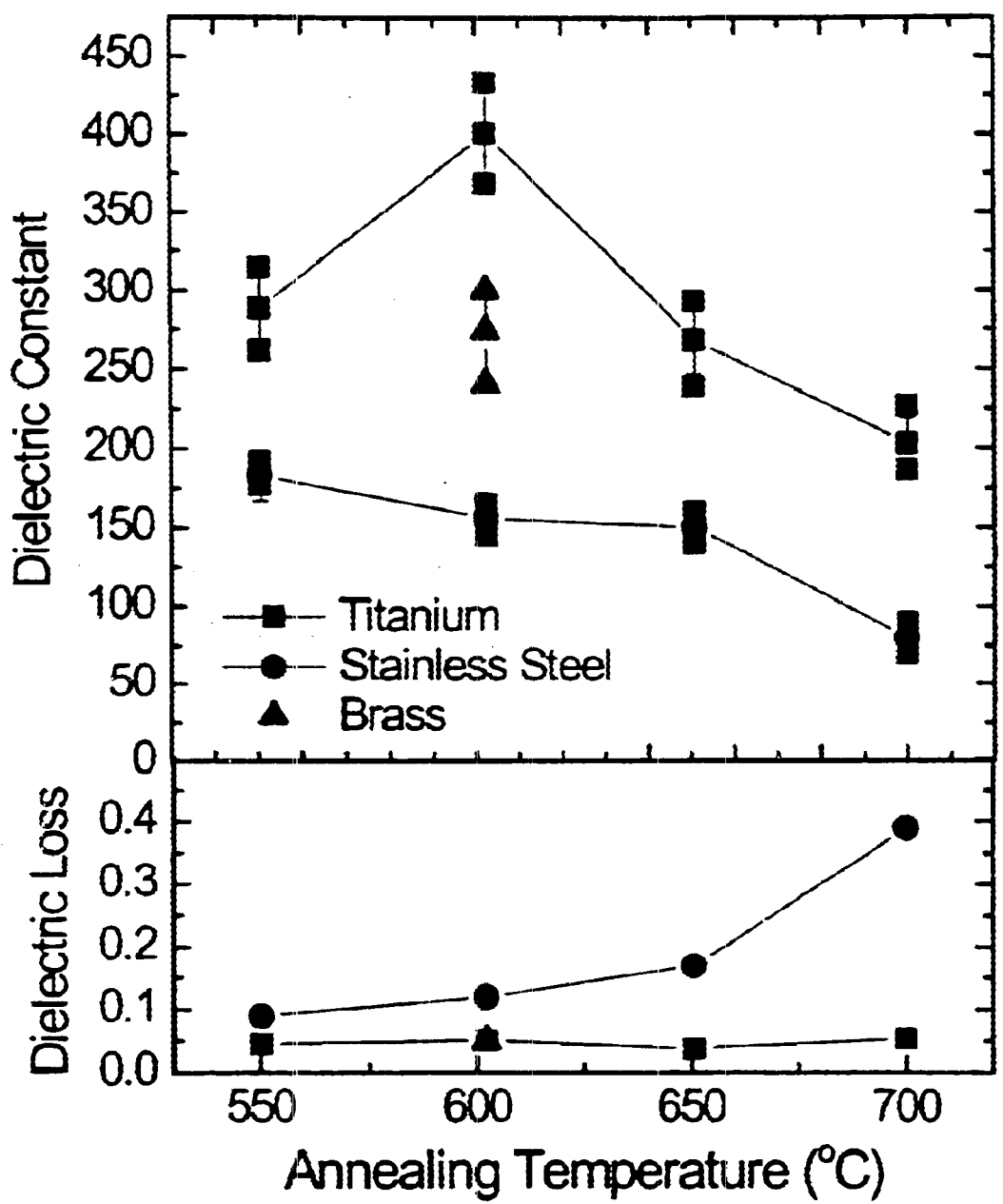
FIG. 2 is a plot of the dielectric constant of PZT films formed on selected metallic foils as a function of annealing temperature for selected metallic foils. The thickness of the film is about 660 nm, the electrode area is 0.5 mm$^2$ and the dielectric constant was measured at 10 kHz at room temperature.

The thin film composites were measured at room temperature at zero bias with modulation voltage of 200 mV. FIG. 2 demonstrates the effect of annealing temperature on the dielectric constant of PZT films deposited on selected metallic foil substrates.

Example 2

PZT precursors were prepared as set forth in Example 1. 650-nm thick PZT films were then spin-coated onto a variety of metallic foils including (a) titanium foil (thickness d=0.4 mm, surface roughness, Ru=550 nm), aluminum foil (d=0.05 mm, Ru=300 nm), stainless steel foil (SS) (d=0.042, Ru=400 nm), brass sheet (BR) (d=1.2 mm, Ru=60 nm) and nickel alloy sheet (NK) (d=1.5 mm, Ru≈800 nm). Evaporated Au top electrodes with an area of $5 \times 10^{-3}$ cm$^2$ were used to measure dielectric properties. The capacitance-voltage (C-V), capacitance-frequency (C-f) and current-voltage (I-V) measurements were performed using a HP 4275A LCR meter and a HP 4140B picoammeter at room temperature. The hysteresis behavior was examined using a Radiant RT6000 S ferroelectric test system.

Table 2 summarizes the results of the room temperature dielectric property measurements on the selected substrates:

TABLE 2

| Substrate | Sample Code | Annealing temp. (° C.) | Dielectric constant (10 kHz) | Dielectric loss (%) (10 kHz) | Breakdown voltage (KV/cm) | DC resistance at IV (GΩ) |
|---|---|---|---|---|---|---|
| Titanium | Ti600 | 600 | 400 | 4.0 | 600 | 5000 |
| Stainless steel | SS650 | 650 | 155 | 15 | 590 | 0.25 |
| Brass | BR600 | 600 | 256 | 4.8 | 288 | 0.13 |
| Nickel alloy | NK600 | 600 | 20 | 2.1 | | 7000 |

X-ray photoelectron spectroscopy (XPS) showed that the PZT film on Ti foil had a Ti/TiO$_x$/PZT structure. This is likely due to the formation of a titania (TiO$_x$) layer with relatively low dielectric constant ($\in$<80) between the Ti and PZT.

Figure 3:
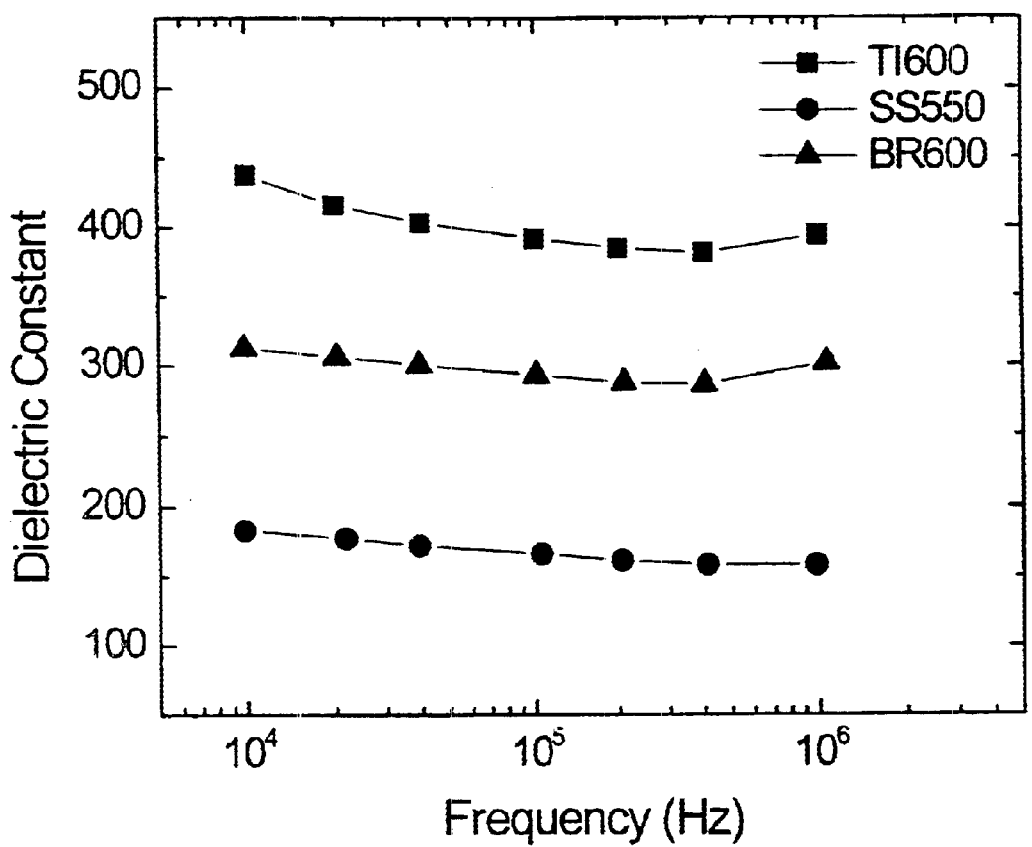
FIG. 3 is a plot of the dielectric constant as a function of frequency for selected metallic foils, i.e., titanium (sample T600), stainless steel (S550), and brass (B600). Films were as depicted above and measured at room temperature at zero bias with A modulation voltage of 200 mV.
Figure 4:
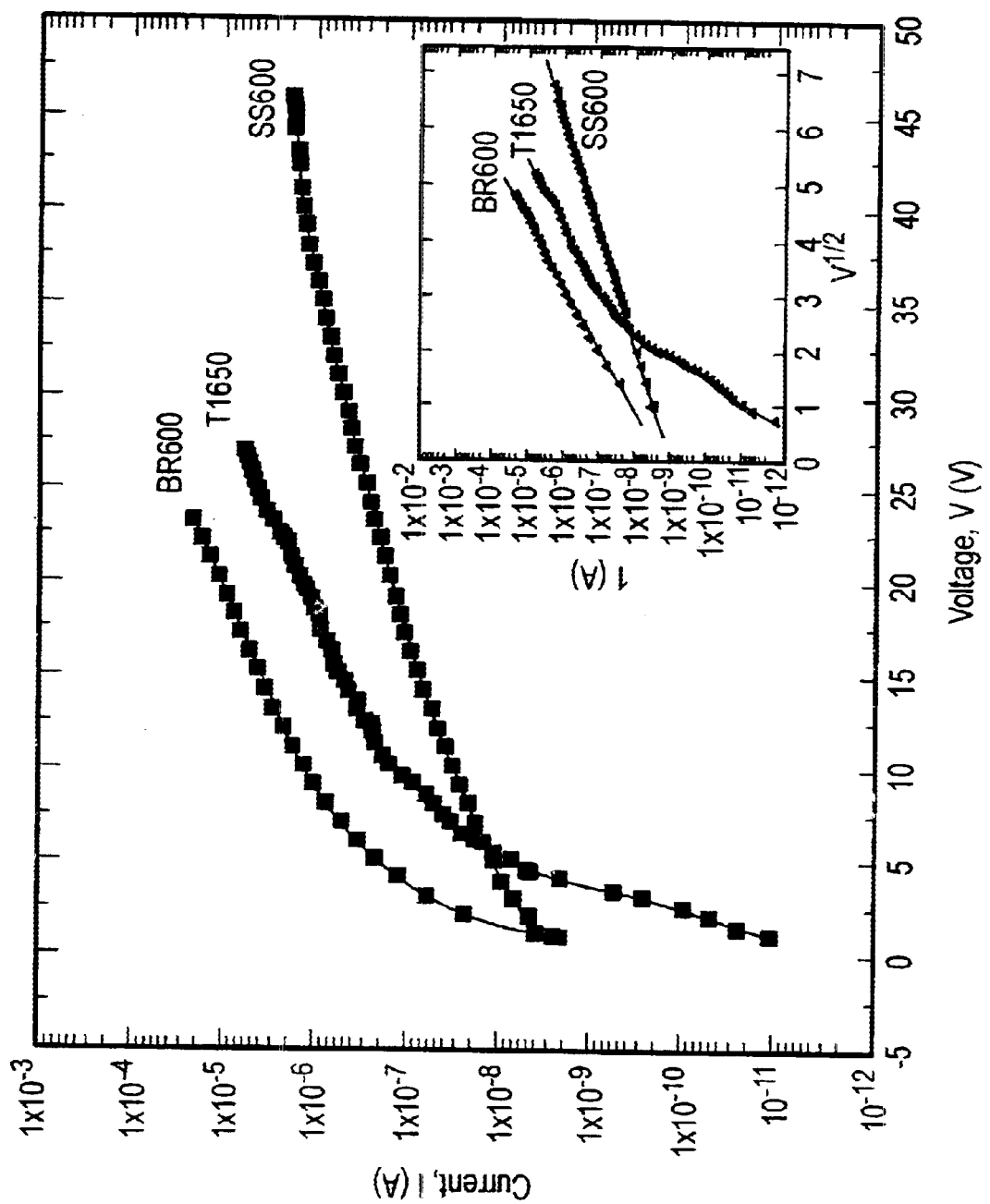
FIG. 4 represents current voltage curves for PZT films on different metal substrates. Inset shows I–V$^{1/2}$ curves. The thickness of the film is about 660 nm, the electrode area is 0.5 mn$^2$ with measurements made at room temperature.

FIG. 3 shows the dielectric constant and loss as a function of frequency. These capacitor systems have excellent frequency characteristics, with the dielectric constant remaining virtually constant up to 1 MHz. These types of capacitors can potentially be used in high frequency applications.

FIG. 2 shows the dielectric constant and loss as a function of PZT annealing temperature. For PZT/Ti foil, an optimum annealing temperature was about 600° C., at which the higher dielectric constant and low loss were obtained. Above this temperature, dielectric constant decreased with increasing annealing temperature. This may be attributed to increased thickness of the titania with annealing temperature. Where the foil was stainless steel, the dielectric constant decreased, but the dielectric loss greatly increased with increasing annealing temperature in the range of 550–700° C. This reflects the increased concentration of Cr and Ni diffusing into the PZT film. The higher annealing temperature likely results in much deeper diffusion of Ni and Cr.

FIG. 3 shows the current-voltage curves for the stainless steel (SS600) and brass (BR600) based capacitors. The titanium (Ti650) and stainless steel (SS600) capacitors showed the lowest leakage current, $10^{-12}$ A to $10^{-8}$ A, up to 5V. In the insert to FIG. 3, this data is presented in a standard Schottky plot, with all the data following log $(I/T^2)=AV^{1/2}$ where I is the current, T is the temperature, V is the applied voltage, and A is a constant. For the case of the Ti650 capacitor, there are two different slopes. This behavior again probably reflects the titania layer between the PZT and Ti foil.

Figure 5:
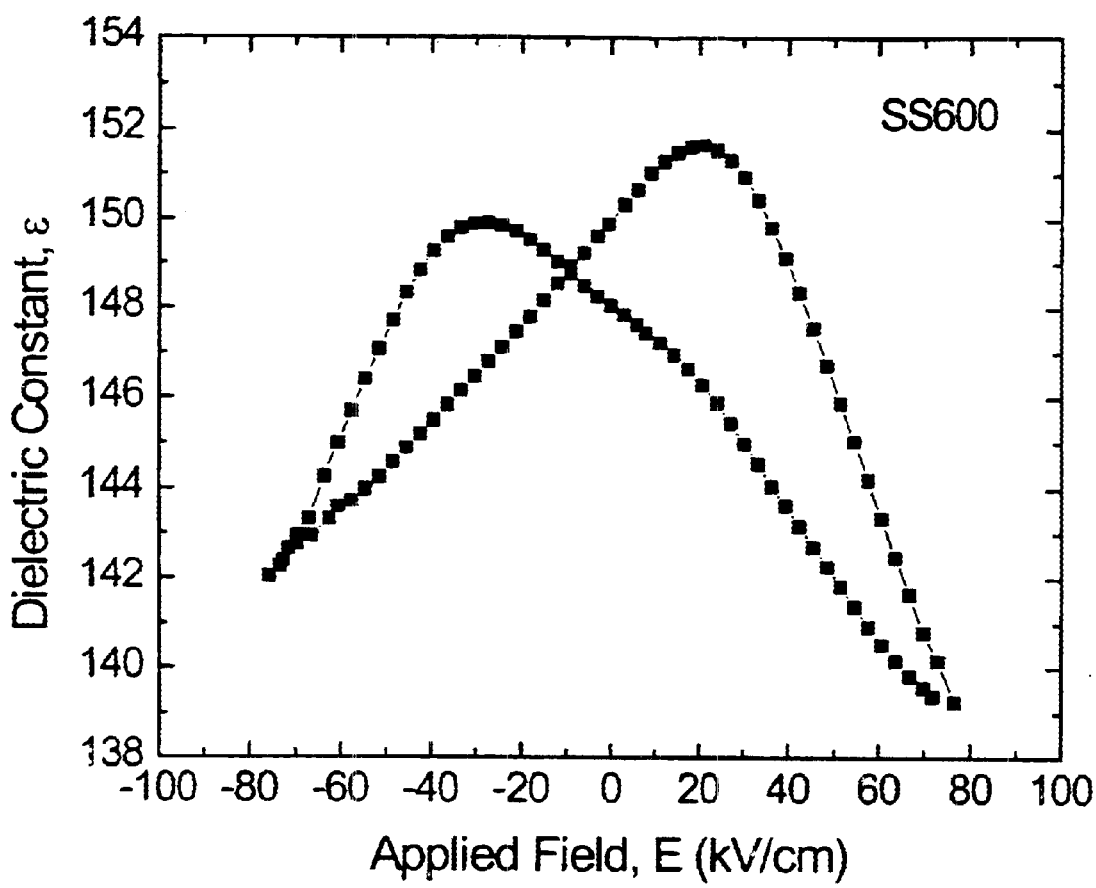
FIGS. 5(*a*)–5(*c*) represent plots of dielectric constants as a function of electric field for the PZT films on stainless steel (FIG. 5(*a*)), titanium (FIG. 5(*b*)), and brass (FIG. 5(*c*)) substrates, measured at room temperature and a frequency of 10 kHz frequency.
Figure 5:
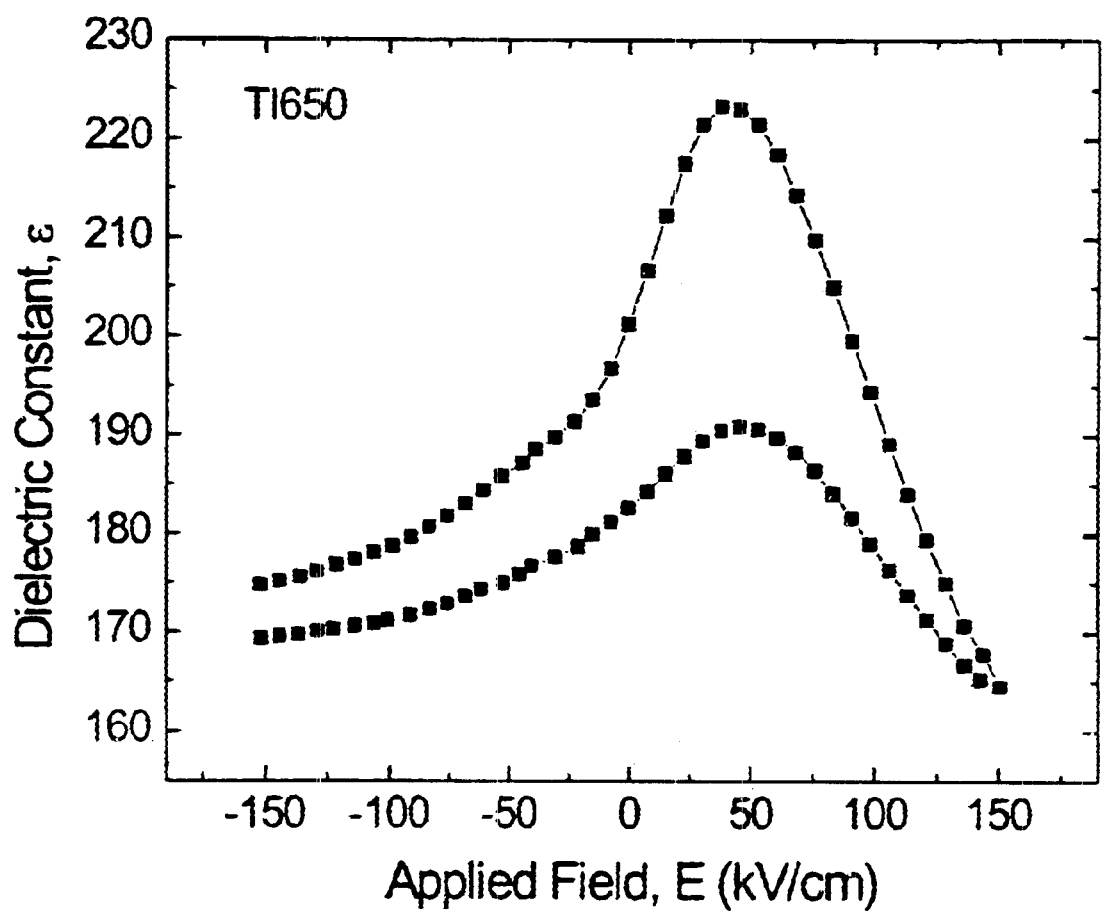
Figure 5:
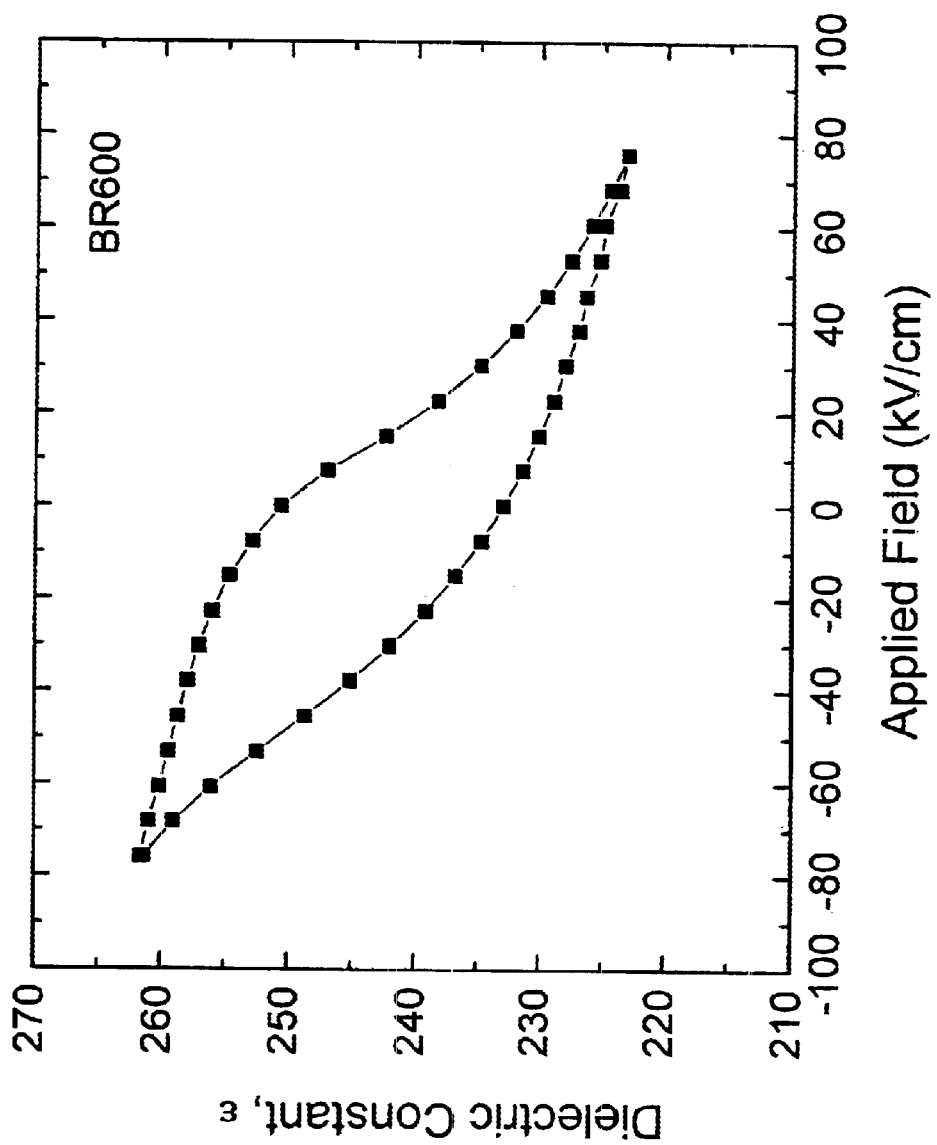

FIGS. 5(a) through 5(c) shows the dielectric constant as a function of electric field for various metal substrates at 10 kHz. The $\in$-E characteristics on titanium (FIG. 5(b)), stainless steel (FIG. 5(a)), and brass (FIG. 5(c)), metal substrates are quite different. For PZT on stainless steel, the C-V behavior is that of a typical ferroelectric material. The maximum dielectric constant of about 150 was obtained for a coercive field of 25 kV/cm. The data for the brass substrate implies that at the interface between PZT and brass, a semiconducting layer was formed after high temperature annealing.

The examples show the fabrication of ferroelectric PZT films on titanium, stainless steel, brass, and nickel alloy substrates, using sol-gel processing and annealing.

The PZT films on these substrates were crack-free, and showed strong adhesion without any signs of delamination. Capacitor with relatively high dielectric constant ($\in$=400), low dielectric loss (tgδ<5%), low leakage current (I$_L$<5×$10^{-8}$ A at 5V) and high breakdown field strength were obtained. Excellent high frequency properties were observed in the case of capacitors on titanium, stainless steel, and brass substrates.

Various modifications may be made in the native, composition, operation, and arrangement of the various elements, steps and procedures described herein without departing from the spirit and scope of the invention as defined in the following claims.

What is claimed is:

1. A multi-layer thin film composite comprising a substrate and at least one crystalline dielectric layer of the formula PbZr$_x$Ti$_y$O$_z$ or PbL$_b$Zr$_x$Ti$_y$O$_z$ wherein L is a lanthanide metal, b is from about 0.02 to about 0.10, x and are independently between from about 0.35 to about 0.65 and z is between from about 2.5 to about 5.0 and wherein the thickness of the dielectric layer is between form about 100 to about 1000 nm and further wherein the substrate consists of a metallic foil having a thickness from about 0.05 mm to about 1.5 mm.

2. The thin film composite of claim 1, wherein the metallic foil is an elemental metal.

3. The thin film composite of claim 2, wherein the metallic foil is either a flat surface, textured surface or macroporous surface.

4. The thin film composite of claim 1, wherein the dielectric layer is composed of a single layer of a dielectric material.

5. The thin film composite of claim 1, wherein the dielectric layer is composed of multiple layers of dielectric materials in a regular or irregular superlattice structure.

6. The thin film composite of claim 1, wherein a barrier layer is interposed between the metallic foil substrate and the at least one crystalline dielectric layer.

7. The thin film composite of claim 1, wherein the dielectric is PbZr$_x$Ti$_y$O$_z$.

8. The thin film composite of claim 7, wherein x and y are 0.5 and z is 3.

9. The thin film composite of claim 7, wherein x is 0.48, y is 0.52, and z is 3.

10. The thin film composite of claim 7, wherein thin film composite has a dielectric constant of at least 400.

11. The thin film composite of claim 1, wherein the dielectric layer is Pb$_a$La$_b$Zr$_x$Ti$_y$O$_z$ or Pb$_a$Nb$_b$Zr$_x$Ti$_y$O$_z$ wherein a is from out 0.95 to about 1.25.

Figure 1B:
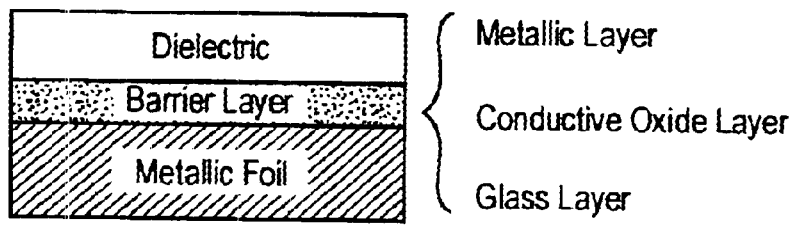
Figure 1C:
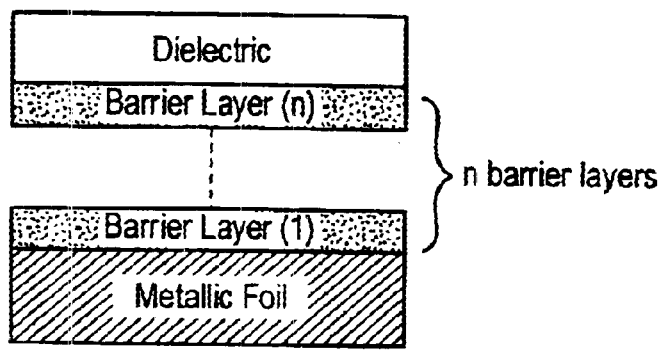
Figure 1D:
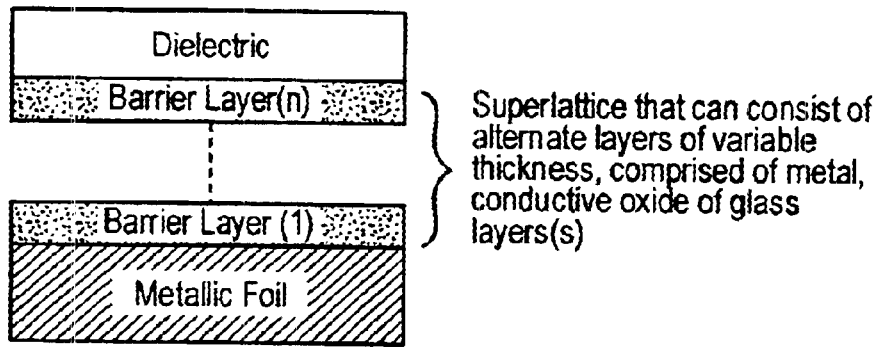
Figure 1E:
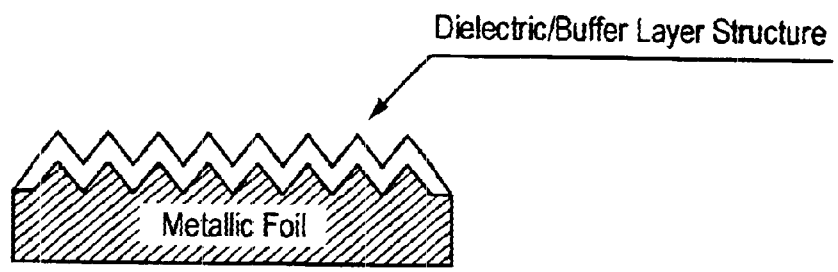
Figure 1F:
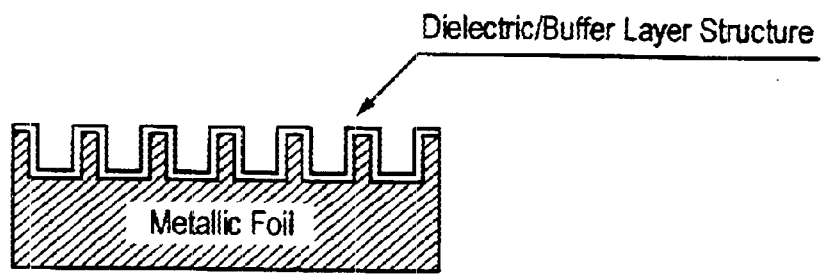

12. The thin film composite of claim 6, wherein the barrier layer is incorporated as depicted in either FIGS. 1(b), 1(c), or 1(d).

Figure 1G:
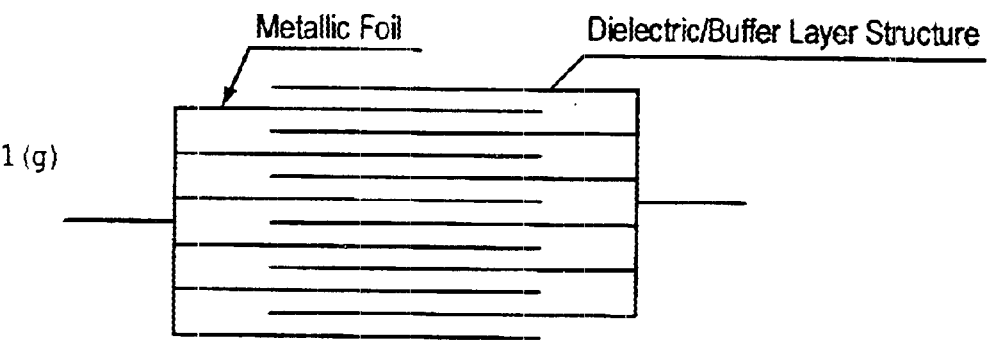
Figure 1H:
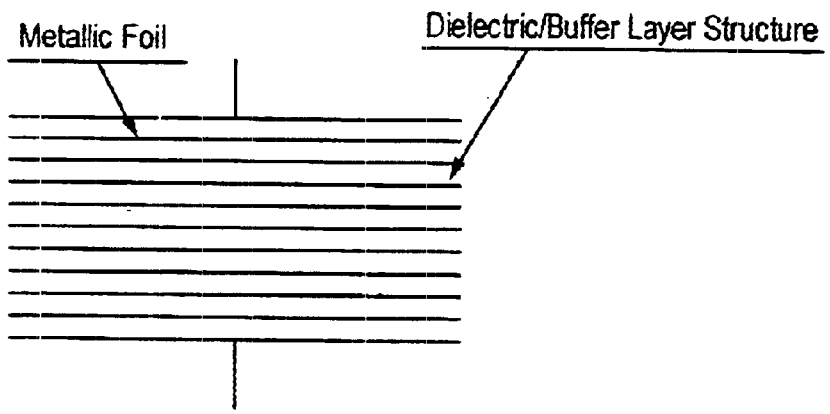

13. The thin film composite of claim 6, further comprising a parallel interconnection of dielectric metallic foil systems, or a series interconnection of dielectric metallic foil systems, as depicted in either FIGS. 1(g) or 1(h), respectively.

14. The thin film composite of claim 1, wherein the metallic foil substrate is brass, platinum, aluminum, nickel alloy, titanium or stainless foil.

15. The thin film composite of claim 14, wherein the metallic foil substrate is titanium, stainless steel, brass or nickel alloy.

16. The thin film composite of claim 1, having a dielectric constant greater than or equal to 400.

17. The thin film composite of claim 1, wherein the dielectric layer exhibits a tetragonal or perovskite crystalline lattice.

18. The thin film composite of claim 16, wherein the metallic foil substrate is titanium, stainless steel, brass or nickel alloy.

19. A multi-layer tin film composite comprising a substrate, at least one crystalline dielectric layer and a metal oxide barrier layer interposed between the metallic substrate and the at least one crystalline dielectric layer, the at least one crystalline dielectric layer having the formula $PbZr_xTi_yO_z$ or $PbL_bZr_xTi_yO_z$ wherein L is a lanthanide metal, b is from about 0.02 to about 0.10, x and y are independently between from about 0,35 to about 0.65 and z is between from about 2.5 to about 5.0 and further wherein the substrate consists of a metallic foil.

20. The thin film composite of claim 19, wherein the metallic foil is either a flat surface, textured surface or macroporous surface.

21. The multi-layer thin film composite of claim 19, wherein the thickness of the metallic foil is between from about 0.05 mm to about 1.5 mm.

22. The multi-layer thin film composite of claim 19 wherein (i) the metallic foil substrate is brass, platinum, aluminum, nickel alloy, titanium or stainless steel foil and (ii) the crystalline dielectric layer exhibits ferroelectric properties.

23. A capacitor comprising the multi-layer thin film composite of any of claims 1 to 22.

* * * * *